April 1, 1969 R. GABLER 3,435,726
HOLDING DEVICE FOR ROCKETS WITH LAUNCHER TUBE
Filed June 2, 1967
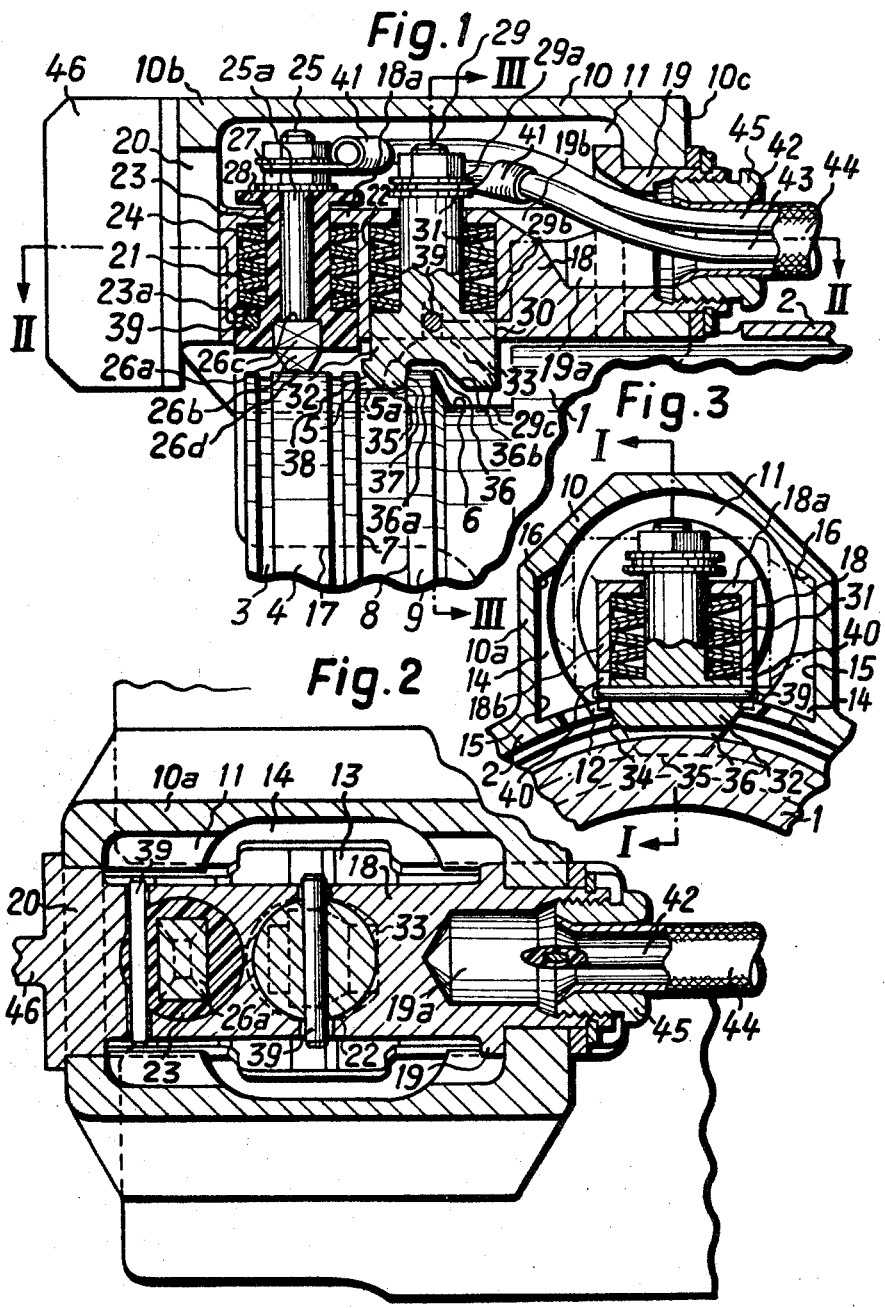
Rudolf Gabler,
Inventor
By Wenderoth, Lind & Ponack
Attorneys

United States Patent Office 3,435,726
Patented Apr. 1, 1969

3,435,726
HOLDING DEVICE FOR ROCKETS WITH LAUNCHER TUBE
Rudolf Gabler, Heiden, Switzerland, assignor to Oerlikon-Buhrle Holding Ltd., Zurich, Switzerland
Filed June 2, 1967, Ser. No. 643,247
Claims priority, application Switzerland, June 10, 1966, 8,454/66
Int. Cl. F41f 3/04
U.S. Cl. 89—1.807
8 Claims

ABSTRACT OF THE DISCLOSURE

A device for holding a rocket in a launcher tube has a stop which is secured, radially movable, to the launcher tube and can be swung about an axis parallel to the axis of the launcher tube. The stop can be swung out of a holdover position, in which the rocket is held in the launcher tube, into a rest position, in which the rocket is freely movable in the tube. The stop, in the holdover position, is pressed radially against the rocket by a spring.

---

The invention relates to a device for holding rockets within a launcher tube.

An object of the invention is to provide a holding device whereby a rocket can be easily inserted in the launcher tube, without large forces having to be overcome in engaging the holding device.

A further object is to provide a holding device with which the rocket can easily be removed from the launching tube, without large forces having to be overcome in disengaging the holding device.

A still further object of the invention aims at producing a device wherein a strong spring urges a stop of the holding device into a recess of the rocket to secure the rocket in the launcher tube and the resistance of such spring need not be overcome when inserting the rocket in the launcher tube, or when removing the rocket from the launcher tube.

A further object of the invention is to provide a stop swingable about an axis parallel to the launcher tube into a rest position in order to release the rocket and into a holding position for retaining the rocket.

With the above and other objects in view which will become apparent from the detailed description below, a preferred modification of the invention is shown in the drawings in which:

FIG. 1 is a longitudinal sectional view through the holding device, with a portion of the rocket in elevation.
FIG. 2 is a section on section line II—II of FIG. 1 and
FIG. 3 is a section on section line III—III of FIG. 1.

On the cylindrical base of a rocket 1 partially shown in FIG. 1, which will be launched from a launcher tube 2, the portion of the surface bounded by two annular grooves 3 forms a contact place 4. Two additional annular grooves 5 and 6 are provided in front of this contact place 4, whereby the rear annular groove 5 is bounded by surfaces 7 and 8 arranged perpendicular to the axis of the rocket. These annular grooves 5 and 6 are separated from each other by a flange rim 9. The diameter of the base of the rear annular groove 5 is larger than that of the front annular groove 6.

A protective casing 10 is fixed, like a saddle, on the rear end of the launcher tube 2. The space 11 enclosed by this casing 10 forms part of a cylinder, the longitudinal axis of which parallel to the tube axis has, between it and the surface of the launcher tube 2, a clearance which is smaller than its radius. An aperture 12 is cut in the wall of the launcher tube 2, which is bounded laterally by the lines of intersection of the casing space 11 with the surface of the launcher tube 2. As FIGS. 2 and 3 show, recesses 14 exist in both walls 10a of the casing 10, which are bounded in the longitudinal direction by surfaces 15, which lie parallel to the plane of symmetry of the casing 10, while the top surfaces 16 are inclined to this plane of symmetry. The aperture 12 has, moreover enlargements 13 in the area of these recesses 14. As FIG. 1 shows, from the end of the tube 2 a slot 17 is, moreover, provided in its wall.

A carrier body 18 is arranged in the casing 10, which has two pivot pins 19 and 20 which are rotatably supported in the front and rear walls, 10c and 10b respectively, of the casing and the axis of rotation of which coincides with the axis of the casing space 11. The prism-shaped carrier body 18 has two parallel holes 21 and 22, lying one behind the other in relation to its axis of rotation, arranged perpendicular to the latter.

In the rear hole 21, a sleeve 23 of electrically non-conducting material is movably supported, the flange-like shoulder 23a of which is under the pressure of a set 24 of cup springs, supported on the base of the hole. A contact pin 25 is inserted in the bore of the insulating sleeve 23, coaxial with the hole 21. The cross-section of the headpiece 26a connected to the shaft 25a of the pin 25 is rectangular, whereby its width, as FIGS. 1 and 2 show, is greater than the diameter of the shaft 25a. The end 26b of the head is made pyramid-shaped. The pin 25 is secured in the insulating sleeve 23 by a nut 27, which is screwed on to the end of the contact pin 25 projecting through the cover 18a of the carrier body 18 into the casing space 11, and which is supported against the sleeve 23 through the insulating washer 28. The clearance of the end surface 26a of the contact pin 25 from the axis of rotation of the carrier body 18 is smaller than the radius of the cylindrical casing space 11.

The retaining body 29 is movably supported in the front hole 22 of the carrier body 18, which in addition forms a contact body. Both the shaft 29a projecting through the cover and the cylindrical headpiece 30 connected to the same, having a greater diameter than the latter, serve to guide the retaining body 29 in the carrier body 18. The retaining body 29 is under the pressure of a spring element 31 formed by a set of cup springs supported on one side of its ring-shaped shoulder 29b and on the other on the cover 18a of the carrier body 18, which, within the stroke range used, can be compressed by a nearly constant force. The surface of the headpiece 32 of the retaining body 29, more distant from the axis of rotation of the carrier body 18, forms on the front and rear side a portion of a cylinder, the diameter of which is greater than that of the headpiece 30, connected to the shaft 29a. This headpiece 32 has in front a surface 33 perpendicular to the axis of rotation of the carrier body 18. The head of the retaining body 29 is, as FIG. 3 shows, made wedge-shaped, since side surfaces 34 are milled away, which form an acute angle with the plane of symmetry of the carrier body 18.

In the head of the retaining body 29, perpendicular to the plane of symmetry of the carrier body 18, a groove 36 is cut, the rear boundary surface 36a of which is nearly at right angles to the axis of rotation and the base of which lies parallel to the latter. The front boundary surface 36b of the groove forms an acute angle with the portion of longitudinal axis of the retaining body 29 extending away from the carrier body 18. The end surfaces 35 and 26d respectively of the stop 37 lying in the rear of the groove and of the contact pin 25 are rounded concave (FIG. 3), with a radius which is equal to the radius of the corresponding cylindrical contact place 5a or 4 on the base of the rocket 1. The axis of the rounding lies in the plane symmetry of the carrier body 18.

As FIG. 1 shows, on the rear side of the stop 37 a surface 38 is cut from the end surface 35, sloping at an angle of about 45 degrees to the rear in relation to the carrier body 18, aligned perpendicular to its plane of symmetry. The ends of the pins 39, fitting closely in the holes in the insulating sleeve 23 and the retaining body 29, engage in grooves 40, which are cut on the side walls 18b of the carrier body 18, whereby the sleeve 23 and the retaining body 29 are secured against turning.

On the two ends of the contact pin and of the retaining body 29 projecting out of the carrier body 18 into the casing space 11, thimbles 41 of ignition cables are secured. The pivot pin 19 of the carrier body 18 supported in the front wall 10c of the casing 10 is hollow, whereby the hole 19a provided in the same is connected with the casing space 11 through a further hole 19b. The ignition cables 42, 43, which are connected to a power supply, not shown in the illustration, serving for the ignition of the rocket propellant charge, are led to the casing 10 in an armoured tube 44. This armoured tube 44 is secured to a nipple 45 screwed into the pivot pin 19. The contact pin 25 is connected through the cable 42 with the positive pole, and the retaining body 29 through the cable 43 with the negative pole, of the power supply.

On pivot pin 20, projecting out of the rear wall 10b of the casing 10, a control grip 46 at right angles to this, formed by a plate, is secured, the plane of longitudinal symmetry of which coincides with the plane of symmetry of the carrier body 18.

The operation of the holding device described is as follows:

Before the insertion of a rocket 1 in the launcher tube 2, or in order to remove the rocket from the launcher tube 2, the carrier body 18 is located in one of the rest positions shown chain-dotted in FIG. 3, by which its plane of symmetry is situated perpendicular to the plane of symmetry of the casing 10. In this position, the head 32 of the retaining body 29 projects into one of the recesses 14 of the casing 10, the top surface 16 of which forms a stop for the head 32 and therewith for the carrier body 18.

A rocket 1 is slid from the rear into the tube and its axial position is visible in the slot 17 in the tube wall. On rotating the carrier body 18 into the holdover position, as shown in FIGS. 1 to 3 with full chain dot lines, and in which the plane of symmetry of the carrier body 18 coincides with the plane of symmetry of the casing 10, the stop 37 of the retaining body 29 engages in the groove 5 and, furthermore, the end surface 26d of the contact pin 25 rests against the contact place 4 of the rocket base. In this position the stop 37 secures the rocket 1 against sliding in the axial direction, in that its surfaces 36a or 38 respectively are opposite the surface 8 of the flange rim 9 and the rear boundary surface 7 of the groove 5. The contact pin 25 is pressed with slight force and the stop 37 on the other hand, for reasons of safety with greater force against the corresponding contact place 4 or 5 respectively.

To rotate the carrier body 18 into the holdover position, or out of the holdover position into the rest position, only a small torque is required to overcome the moment that the frictional forces acting produce on the end surfaces 26d, 35 of the contact pin 25 and of the stop 37 and therewith on the carrier body 18. As a result of the concave construction of these end surfaces 26d, 35, the operator, on rotating the contact carrier 18, feels when the holdover position is reached.

At the beginning of the movement of a rocket 1 on its discharge, the edge of the wall 7 bounding the groove 5 comes into contact with the rear inclined face 38 of the stop 37, whereby the same is pressed out of the groove 5 on further movement of the rocket and the rocket is thereby released. The spring element 31 is thereby compressed, in which case, however, the compression of the same occurs within that range with which this is possible without the exertion of additional force. Consequently, the force of the propellant gases accelerating the rocket during the extraction of the stop 37 out of the groove 5 is not essentially reduced.

On the movement of the rocket 1 through the launcher tube 2, the gas stream emerging from its nozzle rebounds on the front face 33 of the front part 29c of the retaining body 29 and is thereby deflected laterally. This part 29c of the retaining body therewith protects the stop 37 against the eroding hot rocket propellant gases and prevents its destruction.

Owing to the arrangement of the supporter 18 in a closed casing 10, the points of connection of the contact pin 25 and of the retaining body 29 with the ignition cables 42, 43 and, furthermore, these themselves, are removed from the destructive effect of the rocket propellant gases and, moreover, from the atmospheric influences to which an equipment carrying such a launcher tube 2 is exposed.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A holding device for a rocket within a launcher tube which can be loaded from the rear thereof comprising a casing mounted upon said launcher tube, a carrier rotatably mounted in said casing about an axis parallel to the axis of said tube, a stop for said rocket mounted in said carrier, spring means urging said stop towards said rocket, means for shifting said stop radially with relation to said launcher tube, means for rotating said stop with said carrier, said casing having a recess therein to which said stop may be rotated to a rest position to release said rocket and a hold over position to secure said rocket.

2. A holding device as set forth in claim 1 wherein said shifting means comprises a spring so that said stop in said holdover position of said carrier can be shifted in said carrier radially in relation to said launcher tube against the force of said spring.

3. A holding device as set forth in claim 1 wherein a pivot pin is provided on each end of said carrier, said pivot pin being rotatably mounted in said casing and a contact pin is slidably mounted in said carrier parallel to said stop and one of said pivots having a hole therethrough so that electric leads may be led through said hole to said stop and said contact pin.

4. A holding device as set forth in claim 1 wherein a control grip is secured to said carrier.

5. A holding device as set forth in claim 1 wherein said recess in said rocket is a circumferential groove and said stop has a front boundary surface inclined to the tube axis and a rear boundary surface approximately perpendicular to the tube axis.

6. A holding device as set forth in claim 1 wherein said casing is provided with two recesses, one of said recesses containing said stop in the hold over position while the other recess receives said stop in contact position.

7. Holding device for a rocket within a launcher tube which can be loaded from the rear thereof, comprising a casing fastened to said tube, a support swingable around an axis parallel to said tube axis to a holding and a rest position, a stop member arranged displaceable on said support into a holding and a release position, a spring urging during the holding position of said support said stop member radially towards said tube into its holding position, said tube having a surface for said stop member which during the holding position of said support and said stop member lie against the rocket so that a turning of said support into said rest position when a rocket is present is possible only against the force of said spring, said rocket having a recess into which said support member during the holding position of said support and said stop member extends and said rocket in the holding position of said support being capable of being removed towards the rear from said tube.

8. Holding device for a rocket within a launcher tube which can be loaded from the rear thereof, comprising a casing fastened to said tube, a support swingable around an axis parallel to said tube axis to a holding and a rest position, said support having two ends, a bearing pivot on each of said two ends with which said support bears in said casing, a stop member arranged displaceable on said support into a holding position and a releasing position, a first spring urging said stop member during the holding position of said support radially towards said tube to its holding position, a contact bolt arranged displaceable on said support into a contact position and a releasing position, a second spring urging said stop member during the holding position of said support to move said contact bolt radially towards said tube into its contact position, said rocket having a first recess into which said stop member during the holding position of said support and of said stop member extends, said rocket having a second recess into which said contact bolt during the holding position of said support and in its contact position extends, a bore in one of said two bearing pivots and two electrical leads led through said bore to said stop member and to said contact bolt.

References Cited

UNITED STATES PATENTS

| | | | |
|---|---|---|---|
| 2,448,962 | 9/1948 | D'Ardenne | 89—1.807 |
| 2,712,270 | 7/1955 | Green | 89—1.807 |
| 3,059,542 | 10/1962 | Manz et al. | 89—1.807 |

FOREIGN PATENTS 924,074  4/1963  Great Britain.

SAMUEL W. ENGLE, *Primary Examiner.*

U.S. Cl. X.R.

89—1.814